United States Patent
Parkkinen et al.

(10) Patent No.: US 8,073,479 B2
(45) Date of Patent: Dec. 6, 2011

(54) SYSTEM, METHOD, AND COMPUTER PROGRAM PRODUCT FOR SERVICE AND APPLICATION CONFIGURATION IN A NETWORK DEVICE

(75) Inventors: Jukka Parkkinen, Oulu (FI); Hannu Kauniskangas, Oulu (FI); Kari Kaarela, Oulu (FI); Mikko A Hyvarinen, Oulu (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/882,988

(22) Filed: Sep. 15, 2010

(65) Prior Publication Data

US 2011/0004636 A1    Jan. 6, 2011

Related U.S. Application Data (63) Continuation of application No. 11/739,999, filed on Apr. 25, 2007.

(51) Int. Cl.
*H04Q 7/20* (2006.01)

(52) U.S. Cl. ........ 455/519; 455/518; 455/500; 455/517; 455/414.1; 455/426.1; 370/310; 370/259; 370/260; 370/261; 370/262; 709/203; 709/204; 709/218; 709/219

(58) Field of Classification Search .................. 455/518, 455/519, 500, 517, 403, 422.1, 414.1–414.4, 455/426.1, 426.2, 466, 412.1, 412.2; 370/310, 370/329, 242, 338, 259–262; 709/203, 204, 709/218, 219
See application file for complete search history.

(56) References Cited

U.S. PATENT DOCUMENTS

| | | |
|---|---|---|
| 6,175,831 B1 | 1/2001 | Weinreich et al. |
| 7,069,308 B2 | 6/2006 | Abrams |
| 7,263,076 B1 | 8/2007 | Leibovitz et al. |
| 7,636,779 B2 | 12/2009 | Hayashi et al. |
| 7,730,216 B1 * | 6/2010 | Issa et al. ............ 709/250 |
| 2005/0021725 A1 | 1/2005 | Lobbert |
| 2005/0165785 A1 | 7/2005 | Malkin et al. |
| 2005/0235062 A1 | 10/2005 | Lunt et al. |
| 2006/0259957 A1 * | 11/2006 | Tam et al. ............... 726/3 |
| 2007/0156805 A1 | 7/2007 | Bristol et al. |
| 2007/0255807 A1 | 11/2007 | Hayashi et al. |
| 2007/0282980 A1 | 12/2007 | Fischer et al. |
| 2008/0084875 A1 | 4/2008 | Parkkinen et al. |
| 2008/0155078 A1 | 6/2008 | Parkkinen et al. |
| 2008/0250322 A1 | 10/2008 | Szeto et al. |
| 2008/0288277 A1 | 11/2008 | Fasciano |
| 2009/0221269 A1 | 9/2009 | Bulmer et al. |

OTHER PUBLICATIONS

Service Discovery in Middle Ad-Hoc Networks: Better at the Network Layer? Garcia-Macias et al., Proceedings of the 2005 Intl Conf on Parallel Processing Workshops, IEEE Computer Society, 2005, pp. 1-6.

\* cited by examiner

*Primary Examiner* — Keith Ferguson
(74) *Attorney, Agent, or Firm* — Ditthavong Mori & Steiner, P.C.

(57) ABSTRACT

A method is provided that includes accessing information associated with at least one service or application in a social network. The method also includes detecting at least one event relating to the information associated with the at least one service or application within the social network and modifying the information associated with the at least one service or application in response to the at least one event.

29 Claims, 8 Drawing Sheets

SYSTEM, METHOD, AND COMPUTER PROGRAM PRODUCT FOR SERVICE AND APPLICATION CONFIGURATION IN A NETWORK DEVICE

CROSS-REFERENCE TO RELATED APPLICATIONS

This application is a continuation of U.S. patent application Ser. No. 11/739,999 filed on Apr. 25, 2007, the entirety of which is incorporated herein by reference.

TECHNOLOGICAL FIELD

Embodiments of the present invention relate generally to social network communication technology and, more particularly, relate to a system, method, and computer program product for configuring services and applications in a social network.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information sharing in P2P networks. A P2P network is generally considered a network that relies primarily on the computing power and bandwidth of the devices (i.e., peers) within the network. Accordingly, P2P networks generally do not concentrate computing power and bandwidth within servers. Rather each of the peer devices is capable of simultaneously functioning as both a client and a server to other nodes of the P2P network. The architecture of P2P networks typically involves connecting nodes via largely ad hoc connections over which participant nodes can, for example, share content files containing audio, video, data, or virtually anything in a digital format. Accordingly, data such as real time data or telephony traffic could be shared using a P2P network.

Given the ubiquitous nature of mobile terminals, such as mobile phones and numerous other mobile electronic devices, P2P networks are becoming more common for sharing content and services between individuals of social groups or social networks. These social networks may center on a group of friends, relatives, co-workers, business associates, or people who share a common interest. Each individual (i.e., node) within a social network may invite other individuals to join. As such, although any particular node may generally communicate with a given group of other nodes within the social network, each of the other nodes may subsequently communicate with yet other nodes. Accordingly, within a social network, each node may be defined in terms of a degree of separation from each other node. For example, if user A invites user B to view a particular file on user A's device, and user B subsequently invites user C to view the particular file, user B may be considered to have one degree of separation from user A, while user C may be considered to have two degrees of separation from user A. Accordingly, some originating nodes may place limits on the degree of separation a node may have from the originating device in order to gain access to the content.

Current session initiation between social network members generally requires manual work by each user (e.g., group creation, device scanning, pairing, connection approvals, etc.). In addition, use of any Internet-based service hosted by a member for social networking use cases requires the other members of the social network to manually configure the access levels in order to gain access to the particular service. If the members wish to benefit from all services provided by the social networks at different access levels (e.g., degree of separation ($2^{nd}$, $3^{rd}$, $4^{th}$ etc. level of members)), the amount of manual configuration needed increases.

The introduction of applications for mobile devices requires configuration of settings and parameters in order for the applications to operate properly on the mobile devices. Currently, operators and service providers offer various types of device management services to manage device settings remotely by using SMS provisioning. In addition, mobile device manufacturers are introducing systems that enable remote access to mobile device settings by establishing a real-time connection between the mobile device and help desk operators over a GPRS/EDGE/WCDMA-connection. In many cases these services are not sufficient when the user of the mobile device faces malfunction in the device management system or is not technically skilled to configure the applications. Thus, when the malfunction in introducing an application occurs and when a current device management system can't assist the user, the user may be required to locate the nearest operator's shop or otherwise request assistance from a friend.

In the mobile domain, social network members typically utilize several separated applications like phone, email, SMS, MMS, instant messaging, push-to-talk, file sharing and location sharing to communicate or perform different tasks. Currently, each mobile user may be required to manually configure all necessary applications in his/her device. This means in practice that the user defines application settings and, for example, creates groups, mail lists, or macros that ease the daily usage of the applications. Another possibility is to utilize a centralized device management system, but this system is rarely available for ordinary users. Since social networks typically change often and in many cases are short-lived (e.g., ad hoc groups), manual configuration of the user's device in order to use particular applications can be time consuming and tedious for the user.

Therefore, it may be desirable to provide a method of automatically configuring services within a social network. In addition, it may be advantageous to provide a method for automatically configuring applications on a user's mobile terminal for particular applications the user desires to use within a social network. Furthermore, it may be desirable to provide a method for allowing a member of a social network to remotely access another member's mobile terminal for facilitating configuration of applications on the mobile terminal.

BRIEF SUMMARY

Embodiments of the invention address at least some of the above needs and achieve other advantages by providing a method, a system, and a computer program product for configuring services and applications within a social network. In general, embodiments of the invention include techniques for automatically configuring information associated with applications (e.g., configuration and settings) at one or more mobile terminals within a social network, as well as automatically configuring information associated with services (e.g., user accounts and rights) available to members within the social network. An additional embodiment of the present invention provides techniques for allowing one or more mobile terminals to access a mobile terminal within a social network requesting assistance with configuring one or more applications. Thus, embodiments of the present invention may provide for a more user-friendly experience for members accessing services within a social network. In addition, embodiments of the present invention may more efficiently manage a member's access rights and membership information, as well as facilitate the configuration of a member's mobile terminal and applications for reducing the amount of manual configuration required by members of the social network.

According to one embodiment of the invention, a method, system, and computer program product for configuring services or applications within a social network are provided. For example, the method includes accessing information associated with at least one service or at least one application in a social network. In addition, the method includes detecting at least one event relating to the information associated with the at least one service or application within the social network and modifying the information associated with the at least one service or application in response to the at least one event.

Aspects of the method include searching for configuration information associated with the at least one application within the social network and collecting configuration information associated with the at least one application. The method may include modifying the collected configuration information in response to an event within the social network. Furthermore, the method may include determining configuration information that is required for the at least one application and/or storing the collected configuration information for the at least one application in a configuration repository. The method could also include parsing at least a portion of the collected configuration information and configuring the at least one application using the parsed configuration information.

Additional aspects of the method may include defining a degree of separation between members within the social network required to obtain access to the at least one service provided by a service provider and submitting one or more requests to the service provider to create, delete, and/or update access rights based on the degree of separation. The method may also include submitting a request to create an account to a service provider when the social network is formed. The method could also include creating a configuration repository when the social network is formed.

Additional variations of the method include detecting when a member and/or a service is added to the social network. The method may include submitting a request to a service provider to create an account or update access rights to the at least one service when the member and/or service is added to the social network. The method may include updating a configuration repository containing configuration information associated with the at least one application in the social network when the member and/or service is added to the social network. Moreover, the method may include detecting when a member and/or a service is removed from the social network. The method may include submitting a request to a service provider to delete an account or update access rights of the member when the member and/or service is removed from the social network. The method may also include updating a configuration repository containing configuration information associated with the at least one application in the social network when the member and/or service is removed from the social network.

An additional embodiment of the prevent invention provides a method for remotely configuring one or more applications in a social network. In particular, the method includes receiving a request from a first computing device at one or more other computing devices in a social network for assistance with configuring one or more applications at the first computing device. The method also includes allowing the one or more other computing devices to remotely access the first computing device such that the one or more other computing devices are capable of configuring the one or more applications at the first computing device.

Aspects of the method include remotely accessing the first computing device with the at least one other computing device by establishing a remote data connection between the computing devices. The method may include determining access rights of the at least one other computing device prior to allowing remote access to the first computing device. In addition, the method may include allowing the at least one other computing device to configure the first computing device when the at least one other computing device has access rights.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Embodiments of the present invention will now be described more fully hereinafter with reference to the accompanying drawings, in which some, but not all embodiments of the invention are shown. Indeed, embodiments of the invention may be embodied in many different forms and should not be construed as limited to the embodiments set forth herein; rather, these embodiments are provided so that this disclosure will satisfy applicable legal requirements. Like reference numerals refer to like elements throughout.

Figure 1:
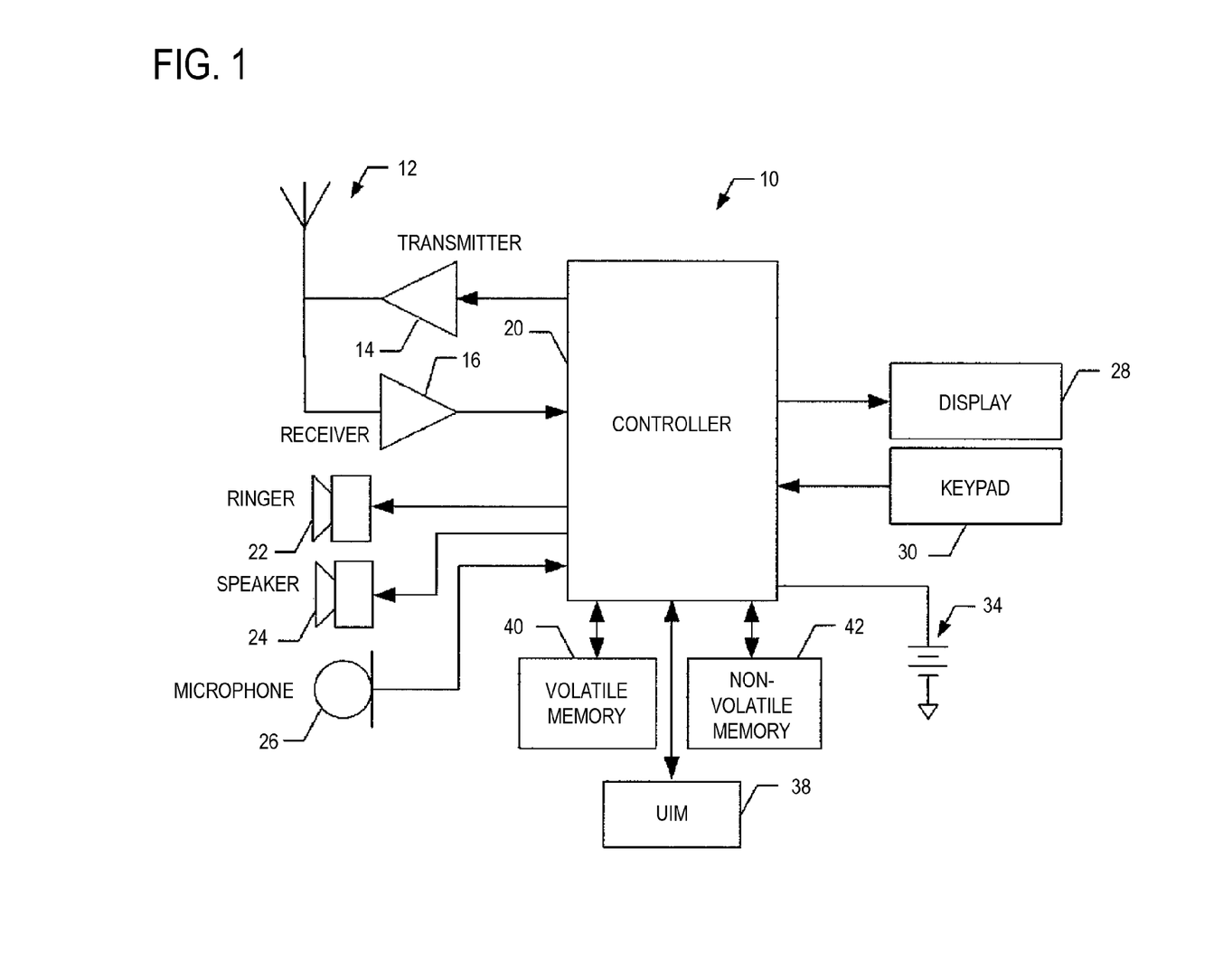
FIG. 1 is a schematic block diagram of a mobile terminal according to an exemplary embodiment of the present invention.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While several embodiments of the mobile terminal 10 are illustrated and will be hereinafter described for purposes of example, other types of mobile terminals, such as portable digital assistants (PDAs), pagers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes a controller 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA), or with third-generation (3G) wireless communication protocols, such as UMTS, CDMA2000, and TD-SCDMA.

It is understood that the controller 20 includes circuitry required for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

The mobile terminal 10 may further include a universal identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif. or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
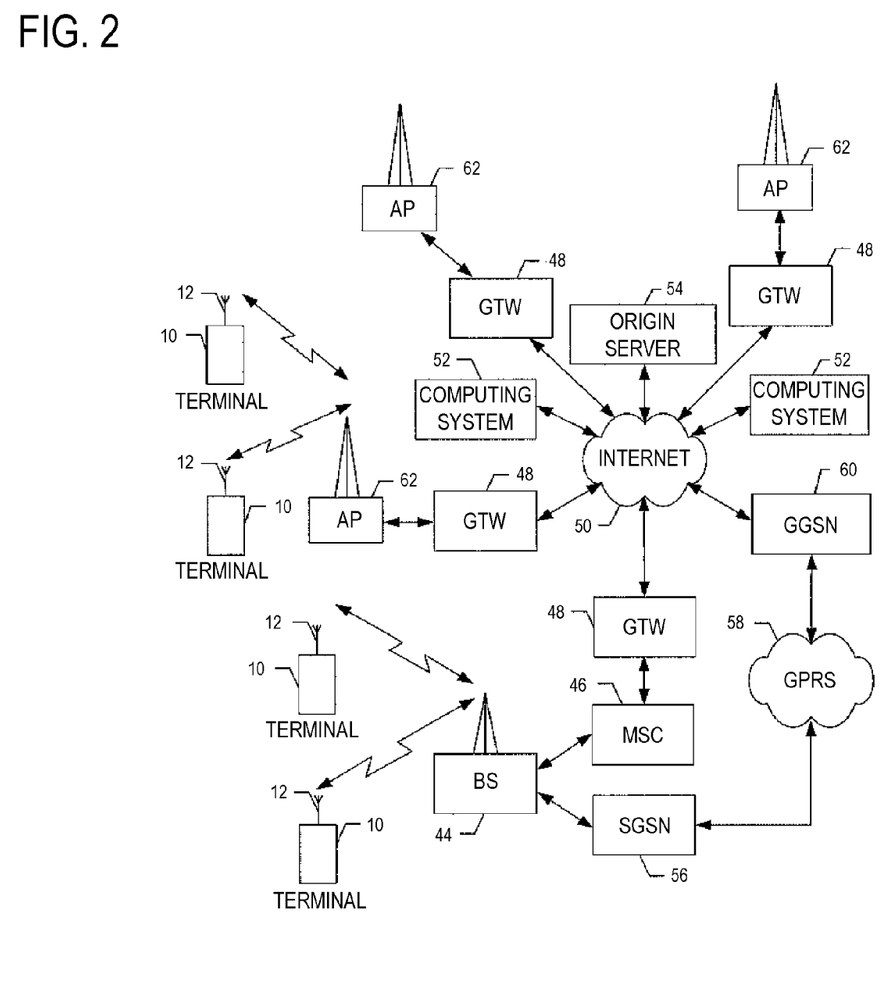
FIG. 2 is a schematic block diagram of a wireless communications system according to an exemplary embodiment of the present invention.

Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G and/or third-generation (3G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a Universal Mobile Telephone System (UMTS) network employing Wideband Code Division Multiple Access (WCDMA) radio access technology. Some narrow-band AMPS (VAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

As described above, social networks may be formed via ad hoc connections between various nodes, which could be computing devices, such as mobile terminals, within a P2P social network, such as supported by the network in FIG. 2. Such connections may then be utilized to, for example, share access to content or services which could include video clips, text, audio data, photographs, etc. It should also be understood that accessing content or services could refer to accessing resources of a particular device. A common way to control access to content or services has been to provide access control lists (ACLs), which inform a particular device which permissions or access rights each user or group has to specific objects such as files or directories. The access control may be based on the identity of a corresponding user (e.g., username, user ID, etc) or the identity of a device (e.g., device name, media access control (MAC) address, Internet Protocol (IP) address, etc.). By utilizing relationships in social networks, other ways of controlling access to content may be implemented.

Embodiments of the present invention relate to the configuration of services and applications for a computing device, e.g., mobile terminal, within a social or P2P network. One embodiment of the present invention facilitates the automatic configuration of information associated with particular services within a social network (e.g., a user's account and rights to the services). This particular embodiment may be employed to configure a user's accounts/rights to an Internet-based community service automatically based on the social networking membership information. An additional embodiment of the present invention provides techniques for automatically configuring a user's mobile terminal for particular applications the user desires to use within a social network. This embodiment may be utilized to automatically and dynamically configure a user's applications utilizing information extracted from a social network (e.g., people in the network, their relationships, people's contact information, people's device information, and services in the network and service settings). Thus, embodiments of the present invention may provide for a more user-friendly experience for members accessing services within a social network. In addition, embodiments of the present invention may more efficiently manage a member's access rights and membership information, as well as facilitate the configuration of a member's mobile terminal and applications for reducing the amount of manual configuration required by members of the social network.

Figure 3:
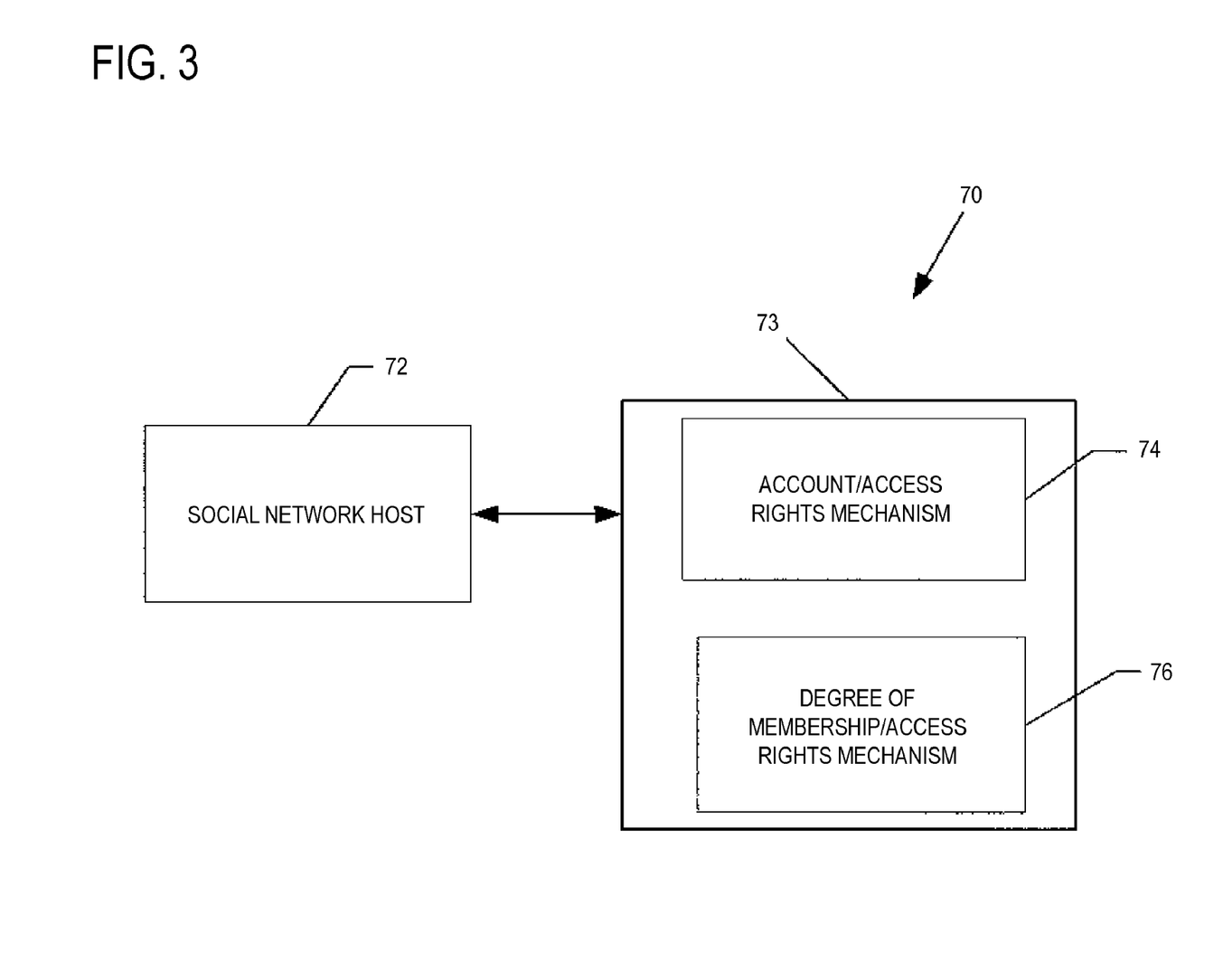
FIG. 3 illustrates a system for configuring services within a social network according to an exemplary embodiment of the present invention.

In general, FIG. 3 depicts a system 70 for automatically configuring information associated with services within a social network, such as a user's account and rights to services within a social network, according to one embodiment of the present invention. Users of a social network are configured to share one or more services between mobile terminals, wherein the services may be provided by a third party, such as an Internet-based service. In order to access particular services available to members of the social network, users may provide membership or account information. For example, members of the social network may provide membership information that may be used to identify the member and/or the member's access rights. Access levels are defined by the user wishing to share access to a particular service, as well as defined by the service provider of the particular service. For example, a user wishing to share photographs with other users within a social network would include access rights for defining which users would have access to the photographs. The service provider may also maintain its own access rights for members of the social network. For example, an Internet-based service may maintain a name and password for a user of a mobile terminal within the social network.

One computing device, such as a mobile terminal, within the social network may act as a master or gateway device. In this regard, members of the social network that have access rights to a particular service may access the service via the master mobile terminal. As such, members may connect to the service through the master mobile terminal such that no changes would be required at the server providing the service since the connection is made directly from the master mobile terminal. The master mobile terminal could submit configuration requests to the service provider such that the service provider supplies a response or output to the mobile terminal of the requesting user. Alternatively, the master mobile terminal could "hand over" the connection to requesting members of the social network such that the connection would be made between the requesting members and the server providing the service. In this case, the server and service provider would be configured to receive requests from users other than the user of the master mobile terminal for access to a service, as well as update membership and access rights to the service. According to one aspect of the present invention, the authentication may be performed by one node and the connection may then be transferred to another node. For example, the authenticating user could give a one-time password token to the server and to the user accessing the service. Both the user accessing the service and the server have the same token such that the authorization of the user can be verified when the connection between the user and server is established.

The system 70 generally includes a social network host 72 and automatic configuration mechanism 73. The automatic configuration mechanism 73 includes an account/access rights mechanism 74 and a degree of membership/access rights mechanism 76. The automatic configuration mechanism and, in turn, the account/access rights mechanism 74 and degree of membership/access rights mechanism 76 may reside on a computing device, such as a mobile terminal and, in one embodiment, are embodied by various means that may be implemented in software stored in memory and executed by the controller 20, while the social network host 72 may be embodied by a server in communication with each of the members of the social network. The host 72 stores membership information, such as membership information for a list of users within a particular social network. In addition, the host 72 defines and maintains degree of membership or separation (d) information, wherein the value of d is the degree of the separation that is calculated based on the user's mobile terminal acting as the social network host.

The account/access rights mechanism 74 is employed to automatically create, delete, and update user accounts and access rights for service(s) based on the social network membership information. For instance, when a social network is formed, the account/access rights mechanism 74 may send the request(s) to form an account to the service provider and grant specific access to all the members of the social network. In addition, when a member is added to the social network, the account/access rights mechanism 74 may send a request to the service provider to either create an account for the new member or update the access control lists to allow that user to access specific data. When a member is removed from the membership list, the account/access rights mechanism 74 may send a request to delete either the account or access rights of that user from the service provider. Thus, the account/access rights mechanism 74 is configured to automatically detect when changes have been made regarding information associated with services provided within the social network.

The degree of membership/access rights mechanism 76 manages the degrees of membership or separation between members in a social network and may create, delete, and update access rights to a service based on degrees of separation information. The degree of membership/access rights mechanism 76 may be a single mechanism or separate mechanisms for managing the degrees of separation and creating, deleting, and updating access rights. The degree of membership/access rights mechanism 76 may manage access rights based on the degree of separation between members in the social network. For example, "core" social network members (e.g., d=1 or one degree of separation; i.e., members who founded the social network) may have the widest access rights, while members of the social network having d>1 (e.g., friends or co-members in other social networks having greater than one degree of separation) could have more limited access rights. The account/access rights mechanism 74 may send requests to a service provider so that the service provider may create, delete, and update its own access rights based on the degree of membership information. In this case, the service provider is configured to receive the degree of separation information and properly handle a user's associated access rights. For example, Universal Plug and Play (UPnP) technology could be employed at the service provider to maintain a control list of all access rights. Alternatively, one user could be an administrator for other users in order to assist the service provider in managing access rights.

For further discussion of determining a degree of separation between members of a social network and accessing and providing services within a social network, Applicants hereby incorporate by reference U.S. patent application Ser. No. 11/539,454 entitled SYSTEM, METHOD, APPARATUS, AND COMPUTER PROGRAM PRODUCT FOR PROVIDING A SOCIAL NETWORK DIAGRAM IN A P2P NETWORK DEVICE filed Oct. 6, 2006, which is assigned to the present assignee, and U.S. patent application Ser. No. 11/615,287, entitled SYSTEM, METHOD, APPARATUS, AND COMPUTER PROGRAM PRODUCT FOR DISCOVERING SERVICES IN A NETWORK DEVICE, filed Dec. 22, 2006, which is assigned to the present assignee.

Figure 4:
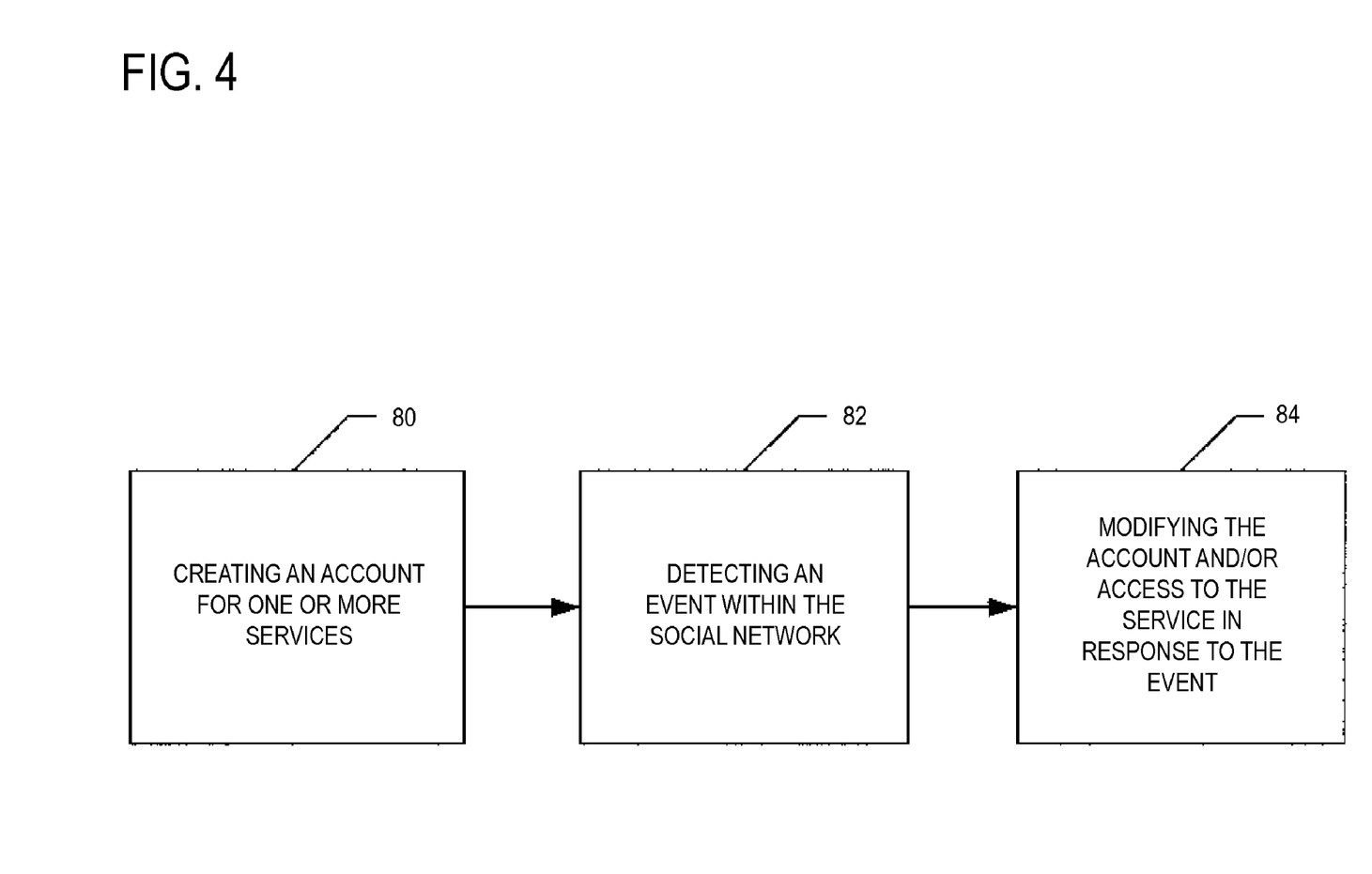
FIG. 4 is a flowchart according to an exemplary method for configuring services within a social network according to one embodiment of the present invention.

Referring to FIG. 4, there is shown a flowchart for a method for configuring services (e.g., membership and access rights information) within a social network according to one embodiment of the present invention. When a social network is formed, a request may be provided to form an account with a service provider for one or more services and to grant access to the services to the members of the social network (block 80). The account/access rights mechanism 74 may access the social network and detect various events that occur within the social network (block 82), such as when a member is added or removed from the social network. The account/access rights mechanism 74 may then modify the account and/or access rights to the one or more services, such as by creating an account for the new member, updating a current account, or deleting the account or access rights (block 84). In addition, the account/access rights mechanism 74 may also update the access rights to the one or more services or request the service provider to update access rights based on changes in the degree of separation between the members within the social network, wherein the changes could be detected by the degree of membership/access rights mechanism 76 and conveyed to the account/access rights mechanism.

Figure 5:
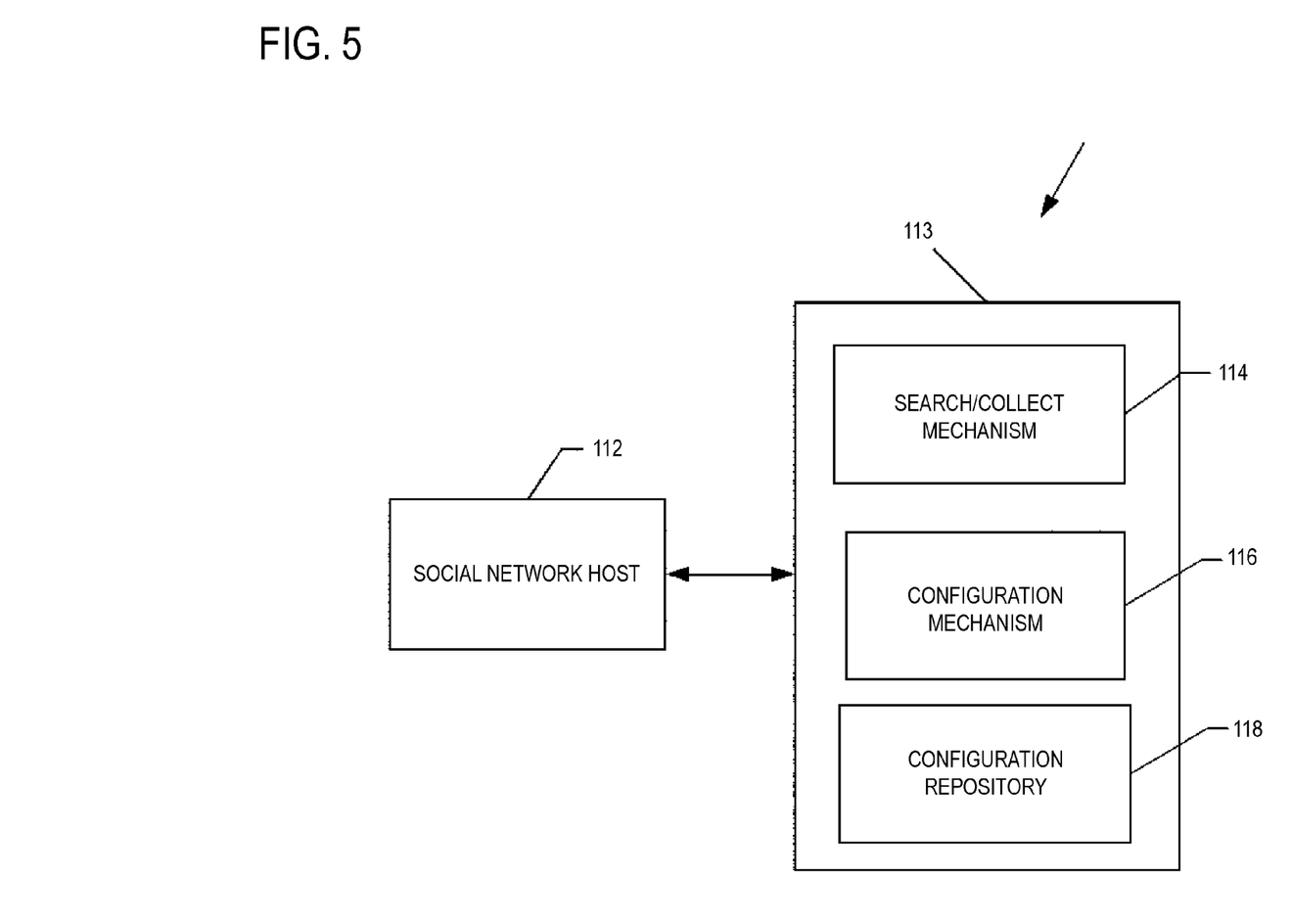
FIG. 5 illustrates a system for configuring applications within a social network according to one embodiment of the present invention.

FIG. 5 illustrates a system 110 according to one embodiment for automatically configuring applications on a user's mobile terminal that the user desires to use within a social network. For example, if the user wishes to use a push-to-talk application in order to communicate with friends, the user can select a friend's group in the push-to-talk application and talk to them. Alternatively, the user can select a friend's group in the social network application and then select push-to-talk functionality. Due to the automatic configuration of the application, the user may not have to manually define settings and create a group for friends to use the push-to-talk application. In addition, when new friends of the user join the group, the group and settings may be dynamically updated to reflect the user's social network. Other examples of configurable applications could be email lists, chat rooms, and bullet boards.

The system 110 includes a social network host 112 in communication with an automatic configuration mechanism 113. The automatic configuration mechanism 113 may reside on a computing device, such as a mobile terminal 10 and, in one embodiment, is embodied by various means that may be implemented in software stored in memory and executed by the controller 20. The automatic configuration mechanism 113 includes a search/collect mechanism 114, a configuration mechanism 116, and a configuration repository 118. Generally, each mobile terminal 10 includes software for instructing the automatic mechanism 113 to determine configuration information that is needed for particular applications and what information can be extracted from the social network for facilitating such configuration. As explained in further detail below, the configuration data may be stored and updated when changes occur within the social network.

The search/collect mechanism 114 is employed to automatically search and collect useful configuration information from the social network and store the information within a configuration repository 118. For instance, the configuration information may be associated with specific applications on the user's mobile terminal 10, or applications that the user is requesting to use within the social network. Thus, a user that joins a group would be able to obtain configuration information for each of the applications available to the users within the social network. In addition, when a social network is formed, the automatic mechanism may create a configuration data repository 118 for storing all collected information. When the social network is updated (e.g., a member or a service is added or removed from the network), the search/collect mechanism 114 may update the configuration repository 118 accordingly. Similarly, when the software for a particular application changes, the search/collect mechanism 114 may determine that this change has occurred, as well as collect any new or different configuration information for the application to be updated in the configuration repository 118.

The configuration mechanism 116 is utilized to manage the configuration of applications when there are changes in the configuration repository 118. The configuration mechanism 116 is capable of determining what configuration data is needed for each application, as well as parsing settings from the configuration data repository and configuring the applications on the user's mobile terminal. In addition, the configuration mechanism 116 is also capable of creating groups, email lists, etc. or other tasks typically performed by the application in order to reduce the usage of the application.

Figure 6:
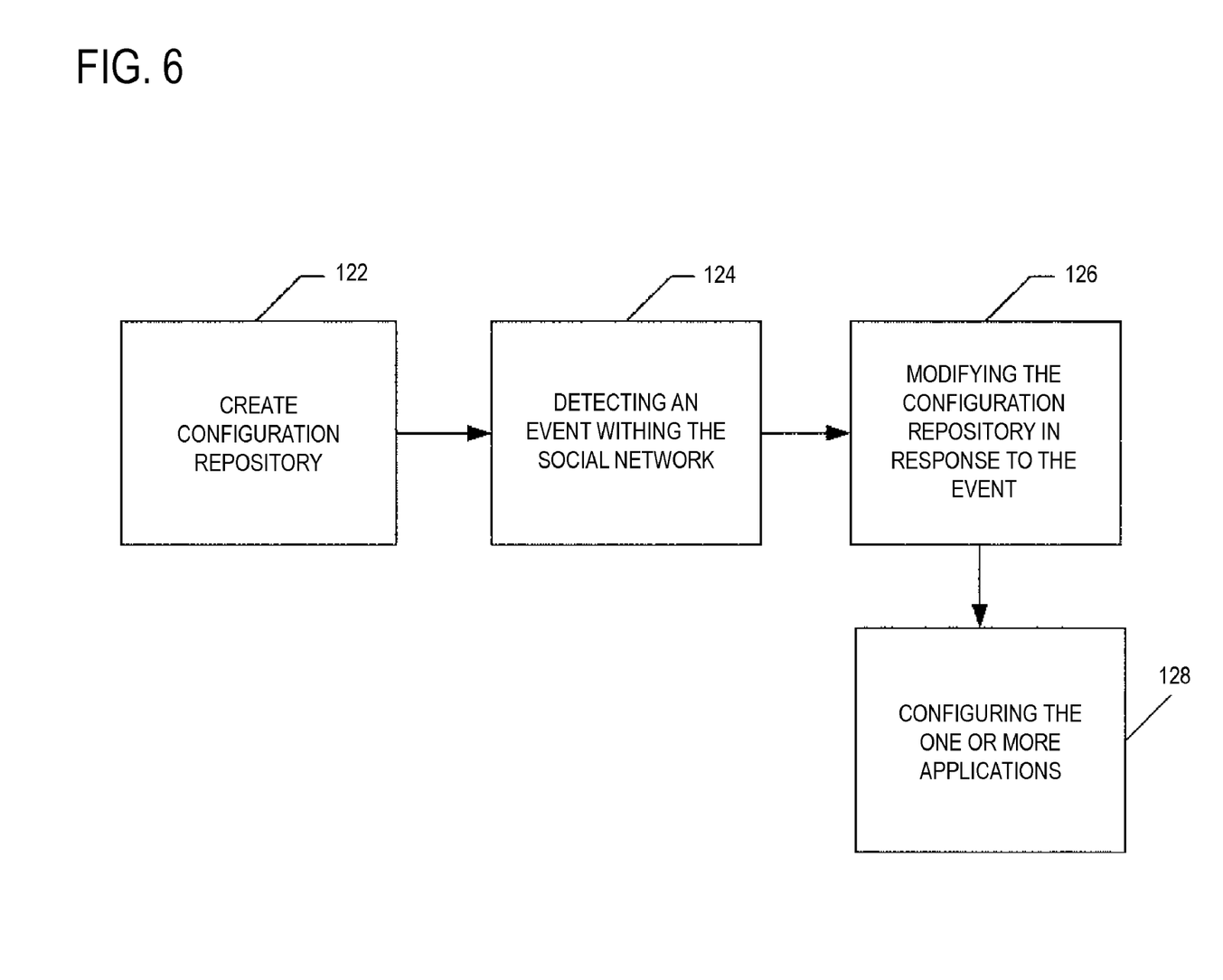
FIG. 6 is a flowchart according to an exemplary method for configuring applications within a social network according to an embodiment of the present invention.

FIG. 6 illustrates a flowchart for a method for automatically configuring applications within a social network according to one embodiment of the present invention. In this regard, the method includes creating a configuration data repository when a social network is formed (block 122). The search/collect mechanism 114 could create the configuration repository 118. The configuration repository 118 may contain various configuration information associated with one or more applications within the social network. Configuration information associated with one or more applications within the social network may also be searched and collected (block 122) in order to populate the configuration repository 118 with configuration information. If an event occurs within the social network (block 124), the currently stored configuration information within the configuration repository 118 may be modified if necessary (block 126). For example, the search/collect mechanism 114 could update the configuration repository 118 when a member is added or removed from the social network. In addition, an event could occur when configuration information changes within the configuration repository. Configuration information within the configuration repository 118 may then be accessed or parsed so that one or more applications may be configured (block 128).

Furthermore, another embodiment of the present invention allows members of a social network to remotely access another member's mobile terminal for facilitating configuration of the mobile terminal. In particular, this embodiment may be employed to establish a remote data connection between social network members and obtain remote access to other mobile devices to configure required or requested applications.

Figure 7:
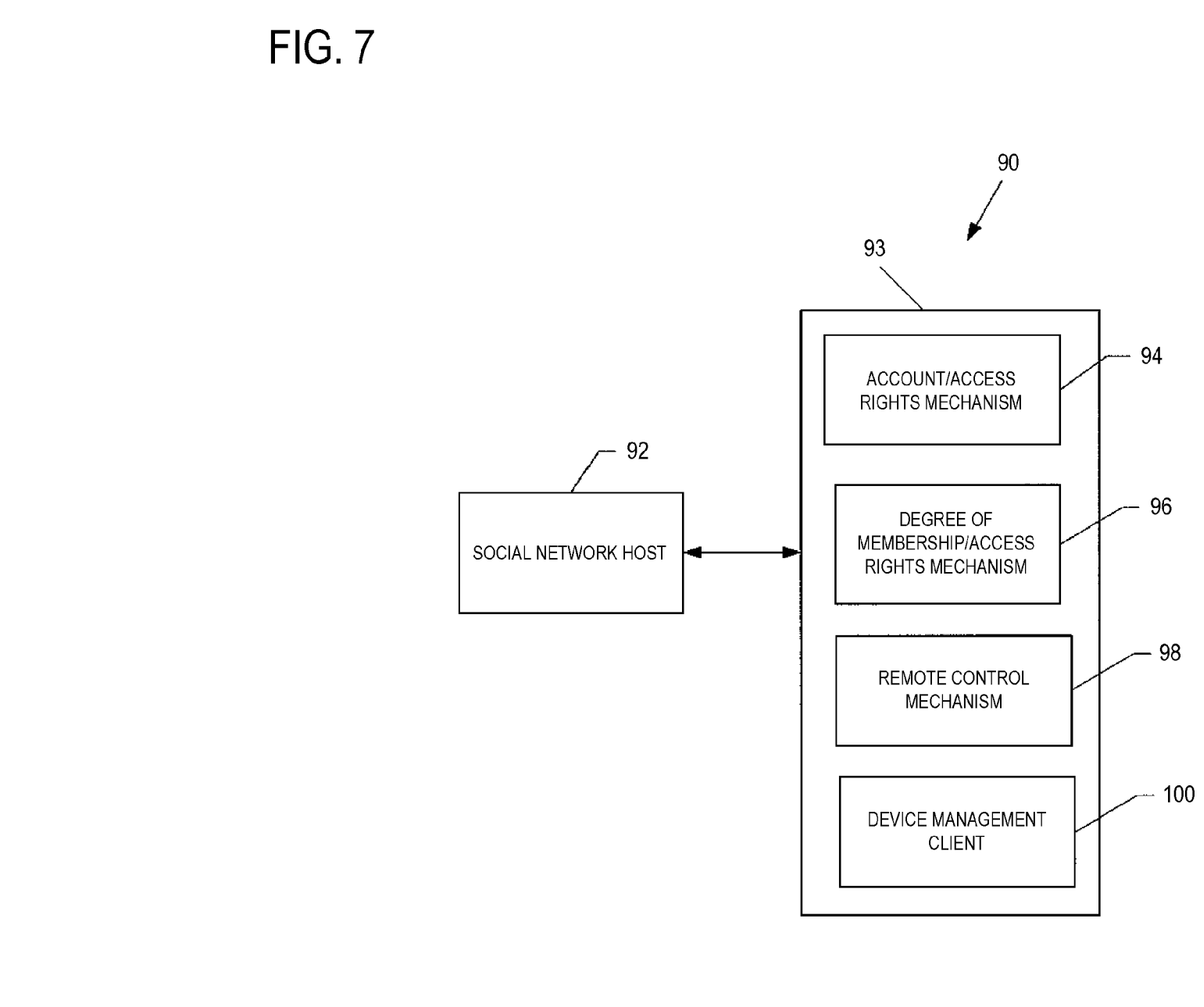
FIG. 7 illustrates a system for remotely configuring a mobile terminal according to an exemplary embodiment of the invention.

FIG. 7 illustrates an embodiment for allowing members of a social network to remotely access another member's mobile terminal for facilitating configuration of the mobile terminal. In particular, this embodiment enables social network members to remotely guide and help other users with an introduction and/or use of an application. The social network provides trusted and authenticated "helping-hands" to assist individuals in various problematic situations, which allows for remote configuration access from other mobile terminals over any connection bearer. For instance, if a user (e.g., grandmother) is having a problem with her MMS settings on a mobile terminal, the user may make an open request to solve the problem within the user's social networks (e.g., family). A social network member (e.g., grandson) may assist the user having the problem by remotely accessing the user's mobile terminal and configuring problematic MMS-settings over-the-air from his or her own mobile terminal. The remote access between mobile terminals within a social network may be established using various data connections, such as over GPRS/EDGE/3G-data connection, although a connection capable of transmitting data between mobile terminals may be employed.

FIG. 7 depicts a system 90 including a social network host 92 and an automatic configuration mechanism 93. The automatic configuration mechanism 93 may reside on a computing device, such as mobile terminal 10, and in one embodiment, is embodied by various means that may be implemented in software stored in memory and executed by the controller 20. The automatic configuration mechanism 93 includes an account/access rights mechanism 94 and a degree of membership/access rights mechanism 96. The social network host 92 and the degree of membership/access rights mechanism 96 include similar functionality as that described above with respect to FIG. 3. In addition, the system 90 includes a remote control mechanism 98 for proving remote control of a mobile terminal and access to other mobile terminals within a social network. The system also includes a device management client 100 for checking access rights of members seeking to access the requesting mobile terminal. Each of the remote control mechanism 98 and device management client 100 may also reside on a computing device, such as a mobile terminal.

The account/access rights mechanism 94 is utilized to create, delete, and update user accounts and access rights in the related remote device management connection based on the social network membership information. In particular, when a social network is formed, a user may publish and send a request regarding an emerging problem with settings or configuration to authorized social network members. When a social network member is remotely accessing another member's mobile terminal, the device management client 100 may check the access level of other member's mobile terminals to verify a device management rights level from social network membership information. According to one aspect of the present invention, there may be a system for pre-setting trusted devices or persons whose authentication information may then be used for granting the access rights. Another implementation could be using a specific device management ticket as access control. Yet another exemplary technique may be a manual acceptance when a member requests access to the terminal.

The remote control mechanism 98 provides remote mobile terminal control and write-level access to other mobile terminals. For example, the remote control mechanism 98 may establish an ad-hoc type of connection between two mobile terminals which are members in the same social network. The remote control mechanism 98 could also provide remote access rights and capabilities to re-configure remotely other mobile terminals or application settings. Moreover, the remote control mechanism 98 may "capture" a mobile terminal's user interface (UI) that requires configuration. For example, the remote user may use his or her mobile terminal to cross over to the mobile terminal of the user having a configuration problem in order to access the mobile terminal and configure the applications.

Figure 8:
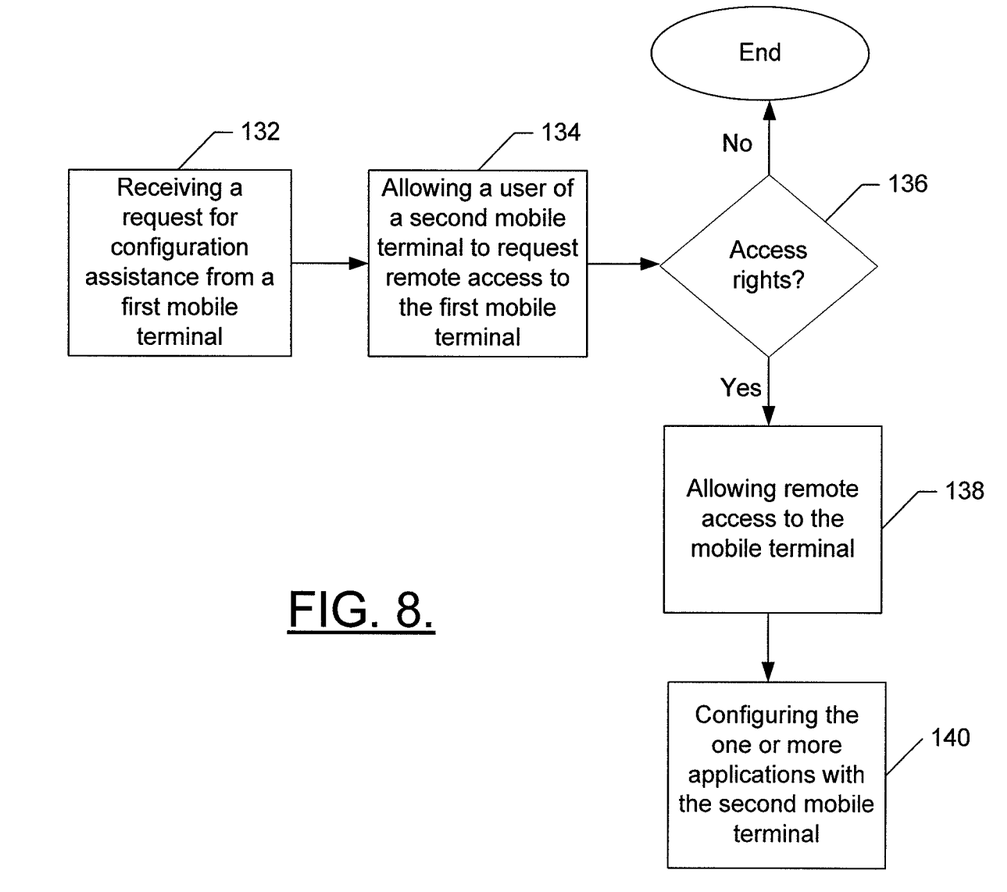
FIG. 8 is a flowchart according to an exemplary method for remotely configuring a mobile terminal according to one embodiment of the present invention.

FIG. 8 depicts a flowchart of a method for remotely accessing and managing applications within a social network according to one embodiment of the present invention. A user of a first mobile terminal that requires assistance with configuring one or more applications within the social network may submit a request for assistance to members of the social network (block 132), such as by publishing a request to all members within the social network or requesting assistance from specific members. One or more members within the social network may then request or otherwise respond to assist the user of the first mobile terminal (block 134). Before allowing remote access to the first mobile terminal, it is first determined whether the member has access rights to do so (block 136). If access rights exist, the user of the second mobile terminal may remotely connect to and access the first mobile terminal (block 138) and may configure the applications that the user of the first mobile terminal requested assistance with (block 140).

FIGS. 4, 6, and 8 are flowcharts of systems, methods, and program products according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of the mobile terminal and executed by a built-in processor in the mobile terminal. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

The above described functions may be carried out in many ways. For example, any suitable means for carrying out each of the functions described above may be employed to carry out embodiments of the invention. In one embodiment, all or a portion of the elements of the invention generally operate under control of a computer program product. The computer program product for performing the methods of embodiments of the invention includes a computer-readable storage medium, such as the non-volatile storage medium, and computer-readable program code portions, such as a series of computer instructions, embodied in the computer-readable storage medium.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   determining to detect at least one event relating to information associated with at least one service, at least one application, or a combination thereof within a social network;
   determining to modify the information associated with the at least one service, the at least one application, or a combination thereof in response to the at least one event;
   determining to configure a user terminal based upon the modified information for sharing the at least one service, at least one application, or a combination thereof with one or more other user terminals in the social network; and
   determining to facilitate access to the at least one service, at least one application, or a combination thereof via the user terminal by the one or more other user terminals,
   wherein the at least one event involves configuring one or more social relationships, one or more access rights, or a combination thereof associated with the user terminal and the one or more other user terminals.

2. A method according to claim 1, further comprising:
   determining to define a degree of separation for the one or more social relationships; and
   determining to configure the one or more access rights according to the degree of separation.

3. A method according to claim 2, further comprising:
   determining to submit one or more access requests to create, delete, or update the one or more access rights based on the degree of separation.

4. A method according to claim 2, further comprising:
   determining to detect at least one event relating to configuring at least one of access rights between user accounts associated with the at least one service, the at least one application, or a combination thereof; and
   determining to configure or modify access rights between the user accounts associated with at least one other service, at least one other application, or a combination thereof, in response to the at least one event.

5. A method according to claim 1, further comprising:
   determining to authenticate access requests by the one or more other user terminals at the user terminal;
   determining to transmit one or more authenticated access requests to the at least one service; and
   determining to forward one or more responses to the authenticated access requests from the at least one service to the one or more other user terminals.

6. A method according to claim 1, further comprising:
   determining to create a configuration repository when the social network is formed; and
   determining to store configuration information of the at least one application, one or more applications on the user terminal, one or more applications available within the social network, or a combination thereof.

7. A method according to claim 6, further comprising:
   parsing at least a portion of the collected configuration information; and
   configuring the at least application using the parsed configuration information.

8. A computer-readable storage medium carrying one or more sequences of one or more instructions which, when executed by one or more processors, cause an apparatus to at least perform the following steps:
   determining to detect at least one event relating to information associated with at least one service, at least one application, or a combination thereof within a social network;
   determining to modify the information associated with the at least one service, the at least one application, or a combination thereof in response to the at least one event;
   determining to configure a user terminal based upon the modified information for sharing the at least one service, at least one application, or a combination thereof with one or more other user terminals in the social network; and
   determining to facilitate access to the at least one service, at least one application, or a combination thereof via the user terminal by the one or more other user terminals,
   wherein the at least one event involves configuring one or more social relationships, one or more access rights, or a combination thereof associated with the user terminal and the one or more other user terminals.

9. A computer-readable storage medium according to claim 8, wherein the apparatus is further caused to perform:
   determining to define a degree of separation for the one or more social relationships; and
   determining to configure the one or more access rights according to the degree of separation.

10. A computer-readable storage medium according to claim 9, wherein the apparatus is further caused to perform:
    determining to submit one or more access requests to create, delete, or update the one or more access rights based on the degree of separation.

11. A computer-readable storage medium according to claim 9, wherein the apparatus is further caused to perform:
    determining to detect at least one event relating to configuring at least one of access rights between user accounts associated with the at least one service, the at least one application, or a combination thereof; and determining to configure or modify access rights between the user accounts associated with at least one other service, at least one other application, or a combination thereof, in response to the at least one event.

12. A computer-readable storage medium according to claim 8, wherein the apparatus is further caused to perform:

determining to authenticate access requests by the one or more other user terminals at the user terminal;

determining to transmit one or more authenticated access requests to the at least one service; and determining to forward one or more responses to the authenticated access requests from the at least one service to the one or more other user terminals.

13. A computer-readable storage medium according to claim 8, wherein the apparatus is further caused to perform:

determining to create a configuration repository when the social network is formed; and determining to store configuration information of the at least one application, one or more applications on the user terminal, one or more applications available within the social network, or a combination thereof.

14. A computer-readable storage medium according to claim 13, wherein the apparatus is further caused to perform:

parsing at least a portion of the collected configuration information; and configuring the at least application using the parsed configuration information.

15. An apparatus comprising:

at least one processor; and at least one memory including computer program code for one or more programs, the at least one memory and the computer program code configured to, with the at least one processor, cause the apparatus to perform at least the following, determine to detect at least one event relating to information associated with at least one service, at least one application, or a combination thereof within a social network;

determine to modify the information associated with the at least one service, the at least one application, or a combination thereof in response to the at least one event;

determine to configure a user terminal based upon the modified information for sharing the at least one service, at least one application, or a combination thereof with one or more other user terminals in the social network; and determine to facilitate access to the at least one service, at least one application, or a combination thereof via the user terminal by the one or more other user terminals, wherein the at least one event involves configuring one or more social relationships, one or more access rights, or a combination thereof associated with the user terminal and the one or more other user terminals.

16. An apparatus according to claim 15, wherein the apparatus is further caused to:

determine to define a degree of separation for the one or more social relationships; and determine to configure the one or more access rights according to the degree of separation.

17. An apparatus according to claim 16, wherein the apparatus is further caused to:

determine to submit one or more access requests to create, delete, or update the one or more access rights based on the degree of separation.

18. An apparatus according to claim 16, wherein the apparatus is further caused to:

determine to detect at least one event relating to configuring at least one of access rights between user accounts associated with the at least one service, the at least one application, or a combination thereof; and determine to configure or modify access rights between the user accounts associated with at least one other service, at least one other application, or a combination thereof, in response to the at least one event.

19. An apparatus according to claim 15, wherein the apparatus is further caused to:

determine to authenticate access requests by the one or more other user terminals at the user terminal;

determine to transmit one or more authenticated access requests to the at least one service; and determine to forward one or more responses to the authenticated access requests from the at least one service to the one or more other user terminals.

20. An apparatus according to claim 15, wherein the apparatus is further caused to:

determine to create a configuration repository when the social network is formed; and determine to store configuration information of the at least one application, one or more applications on the user terminal, one or more applications available within the social network, or a combination thereof.

21. An apparatus according to claim 15, wherein the apparatus is further caused to:

parsing at least a portion of the collected configuration information; and configuring the at least application using the parsed configuration information.

22. A system comprising:

a user terminal configured to detect at least one event relating to information associated with at least one service, at least one application, or a combination thereof within a social network; and the user terminal is also configured to receive the modified information, to configure the user terminal based upon the modified information for sharing the at least one service, at least one application, or a combination thereof with one or more other user terminals in the social network, and to facilitate access to the at least one service, at least one application, or a combination thereof via the user terminal by the one or more other user terminals, wherein the at least one event involves configuring one or more social relationships, one or more access rights, or a combination thereof associated with the user terminal and the one or more other user terminals; and a server configured to receive the information, to modify the information associated with the at least one service, the at least one application, or a combination thereof in response to the at least one event, and to transmit the modified information to the user terminal.

23. A method comprising facilitating a processing of and/or processing (1) data and/or (2) information and/or (3) at least one signal, the (1) data and/or (2) information and/or (3) at least one signal based, at least in part, on the following:

at least one determination to detect at least one event relating to information associated with at least one service, at least one application, or a combination thereof within a social network;

at least one determination to modify the information associated with the at least one service, at least one application in response to the at least one event;

at least one determination to configure a user terminal based upon the modified information for sharing the at least one service, at least one application, or a combination thereof with one or more other user terminals in the social network; and at least one determination to facilitate access to the at least one service, at least one application, or a combination thereof via the user terminal by one or more other user terminals, wherein the at least one event involves configuring or modifying one or more social relationships, one or more access rights, or a combination thereof associated with the user terminal and the one or more other user terminals.

24. A method of claim 23, wherein the (1) data and/or (2) information and/or (3) at least one signal are further based, at least in part, on the following:

at least one determination to define a degree of separation for the one or more social relationships; and at least one determination to configure the one or more access rights according to the degree of separation.

25. A method of claim 24, wherein the (1) data and/or (2) information and/or (3) at least one signal are further based, at least in part, on the following:

at least one determination to submit one or more access requests to create, delete, or update the one or more access rights based on the degree of separation.

26. A method of claim 24, wherein the (1) data and/or (2) information and/or (3) at least one signal are further based, at least in part, on the following:

at least one determination to detect at least one event relating to configuring at least one of access rights between user accounts associated with the at least one service, the at least one application, or a combination thereof; and at least one determination to configure or modify access rights between the user accounts associated with at least one other service, at least one other application, or a combination thereof, in response to the at least one event.

27. A method of claim 23, wherein the (1) data and/or (2) information and/or (3) at least one signal are further based, at least in part, on the following:

at least one determination to authenticate access requests by the one or more other user terminals at the user terminal;

at least one determination to transmit one or more authenticated access requests to the at least one service; and at least one determination to forward one or more responses to the authenticated access requests from the at least one service to the one or more other user terminals.

28. A method of claim 23, wherein the (1) data and/or (2) information and/or (3) at least one signal are further based, at least in part, on the following:

at least one determination to create a configuration repository when the social network is formed; and at least one determination to store configuration information of the at least one application, one or more applications on the user terminal, one or more applications available within the social network, or a combination thereof.

29. A method of claim 28, wherein the (1) data and/or (2) information and/or (3) at least one signal are further based, at least in part, on the following:

at least one determination to parse at least a portion of the collected configuration information; and at least one determination to configure the at least application using the parsed configuration information.

* * * * *